(12) United States Patent
Yang (10) Patent No.: US 6,731,784 B2
(45) Date of Patent: *May 4, 2004

(54) DETECTION AND DETERRENCE OF COUNTERFEITING OF DOCUMENTS WITH A SEAL HAVING CHARACTERISTIC COLOR, SIZE, SHAPE AND RADIAL DENSITY PROFILE

(75) Inventor: Xuguang Yang, Cupertino, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,558

(22) Filed: Aug. 25, 1999

(65) Prior Publication Data

US 2003/0108232 A1 Jun. 12, 2003

(51) Int. Cl.[7] .................................................. G06K 9/00
(52) U.S. Cl. ....................................... 382/135; 194/212
(58) Field of Search ................................ 382/100, 112, 382/135, 308, 168, 173, 162–164; 358/1.2, 1.9; 194/207, 212; 356/419, 73; 704/9; 707/514

(56) References Cited

U.S. PATENT DOCUMENTS

| 4,827,508 | A | * | 5/1989 | Shear ........................... 705/53 |
|---|---|---|---|---|
| 5,048,097 | A | * | 9/1991 | Gaborski et al. ............ 382/156 |
| 5,227,871 | A | * | 7/1993 | Funada et al. ............... 358/500 |
| 5,272,764 | A | * | 12/1993 | Bloomberg et al. .......... 358/453 |
| 5,313,564 | A | * | 5/1994 | Kafri et al. ................... 358/1.9 |
| 5,521,722 | A | * | 5/1996 | Colvill et al. ................ 358/500 |
| 5,638,496 | A | * | 6/1997 | Sato ............................ 358/1.9 |
| 5,761,686 | A | * | 6/1998 | Bloomberg ................. 707/529 |
| 5,765,176 | A | * | 6/1998 | Bloomberg ................. 345/634 |
| 5,877,963 | A | * | 3/1999 | Leung et al. ................ 382/112 |
| 5,892,900 | A | * | 4/1999 | Ginter et al. ................ 713/200 |
| 5,946,414 | A | * | 8/1999 | Cass et al. ................... 382/100 |
| 5,992,601 | A | * | 11/1999 | Mennie et al. ............... 194/207 |
| 6,002,800 | A | * | 12/1999 | Donelly et al. .............. 382/135 |
| 6,014,453 | A | * | 1/2000 | Sonoda et al. ............... 382/135 |
| 6,031,935 | A | * | 2/2000 | Kimmel ....................... 382/170 |
| 6,104,826 | A | * | 8/2000 | Nakagawa et al. .......... 382/100 |
| 6,122,392 | A | * | 9/2000 | Rhoads ......................... 382/100 |
| 6,128,411 | A | * | 10/2000 | Knox ........................... 382/100 |
| 6,272,634 | B1 | * | 8/2001 | Tewfik et al. ................ 713/176 |
| 6,275,304 | B1 | * | 8/2001 | Eschbach et al. ............ 358/1.9 |
| 6,282,328 | B1 | * | 8/2001 | Desai ........................... 382/308 |
| 6,574,350 | B1 | * | 6/2003 | Rhoads et al. ............... 382/100 |

* cited by examiner

*Primary Examiner*—Jayanti K. Patel (57) ABSTRACT

Detection and deterrence of counterfeiting permits one to make legitimate color copies without introducing visual artifacts or experiencing substantial processing delays. An efficient counterfeit deterrence is enabled by the use of an hierarchic detection scheme, in which the majority of documents are classified as free of suspicion using a simple characteristic color detection algorithm that imposes a negligible computational burden. The remainder of documents, which are labeled as suspicious, receive analysis by a block-based morphologic detection algorithm and then possibly other additional detection algorithms. If the suspicious document is identified as being a secure document, this will lead to printing with selectively deteriorated service or complete denial of service. For one embodiment, a seal having characteristic color, size, shape and radial density profile is incorporated into the design of frequently counterfeited documents. In the case of US currency, the already present "treasury green" treasury seal can serve as a suitable seal. The document is partitioned into appropriately sized blocks. A block is labeled suspicious if it contains the characteristic color. The scheme uses a color look-up table (LUT) to detect an initial block with a pixel having the characteristic color. A block-based morphologic detection algorithm then uses dilation to group neighboring suspicious blocks into suspicious regions. One can then examine size, shape, density, and color density profile to check each suspicious region, and to thereby verify that printing of a counterfeit is being attempted. Conventional tests for counterfeit documents can also be used as a further, higher level test.

20 Claims, 7 Drawing Sheets

DETECTION AND DETERRENCE OF COUNTERFEITING OF DOCUMENTS WITH A SEAL HAVING CHARACTERISTIC COLOR, SIZE, SHAPE AND RADIAL DENSITY PROFILE

BACKGROUND OF THE INVENTION

1. Field of the Invention

The present invention relates to printing and, more particularly, to the prevention of printing of counterfeit currency or other documents.

2. Description of the Related Art

Modern technology has made it easy for most people to quickly and inexpensively make accurate color copies of documents. This copying can be achieved through the use of a color copier or by scanning the document and then printing it using a color printer. There are many legitimate uses for this copying technology, however a small percentage of people use color copying to make counterfeit currency or to counterfeit other documents.

One way to prevent counterfeiting is to use techniques such as are taught by Sato, "Color image input apparatus having color image identifying function", U.S. Pat. No. 5,638,496, issued, Jun, 10, 1997. Sato describes a line sensor and image input section that input a color image in a reading area containing an original, an original extracting section that extracts an area of the original from the input image, a normalization section that normalizes an image of the extracted original area to an image of preset size, an image averaging section that converts the normalized image into an averaged image, and a brightness-hue-chroma converting section that converts the averaged image in Vcd images used as color perception amounts of a human being. A pattern matching section collates the Vcd image with dictionary data in a dictionary data storing section to determine whether or not the original is a specified type of original such as a bill, and an image output controlling section then determines whether or not image data output from the color image input section is to be output to the exterior based on the result of the identification.

Thus typical techniques such as searching for a particular pattern or color distribution can be used to detect and stop the copying of a counterfeit document. However, these techniques can be computationally intense and therefore place an undesirable delay on the copying of every document. This delay is particularly undesirable when one realizes that the majority of documents copied are made, not by counterfeiters, but by law-abiding citizens who are copying documents for legitimate purposes.

Thus, it can be seen that current counterfeiting detection and deterrence techniques impose processing delays upon color copying devices, and hinder the use of these devices in many applications.

Therefore, there is an unresolved need for a counterfeiting detection and deterrence technique that permits one to make color copies without imposing processing delays upon color copying devices.

SUMMARY OF THE INVENTION

A method and apparatus is described for detection and deterrence of counterfeiting that permits one to make legitimate color copies without introducing visual artifacts or experiencing substantial processing delays.

An efficient counterfeit deterrence is enabled by the use of an hierarchic detection scheme, in which the majority of documents are classified as free of suspicion using a simple characteristic color detection algorithm that imposes a negligible computational burden. The remainder of documents, which are labeled as suspicious, receive analysis by a block-based morphologic detection algorithm and then possibly other additional detection algorithms. If the suspicious document is identified as being a secure document, this will lead to printing with selectively deteriorated service or complete denial of service.

For one embodiment, a seal having characteristic color, size, shape and radial density profile is incorporated into the design of frequently counterfeited documents. In the case of US currency, the already present "treasury green" treasury seal can serve as a suitable seal. The document is partitioned into appropriately sized blocks. A block is labeled suspicious if it contains the characteristic color. The scheme uses a color look-up table (LUT) to detect an initial block with a pixel having the characteristic color. A block-based morphologic detection algorithm then uses dilation to group neighboring suspicious blocks into suspicious regions. One can then examine size, shape, density, and color density profile to check each suspicious region, and to thereby verify that printing of a counterfeit is being attempted. Conventional tests for counterfeit documents can also be used as a further, higher level test.

The invention is robust, has negligible impact on the time to render a page and negligible effect on general images and documents, while denying printing or generating visible artifacts on banknote or other secure document images. The scheme can be deployed in a printer driver with no hardware changes and can be adjusted to arrive at a compromise that allows reasonable detection, while causing minimal effect on legitimate users. Furthermore, this method can provide a visible indicator that currency is not counterfeit. Moreover, so long as the seal does not change, no alteration is required for a new series of notes.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

Figure 1:
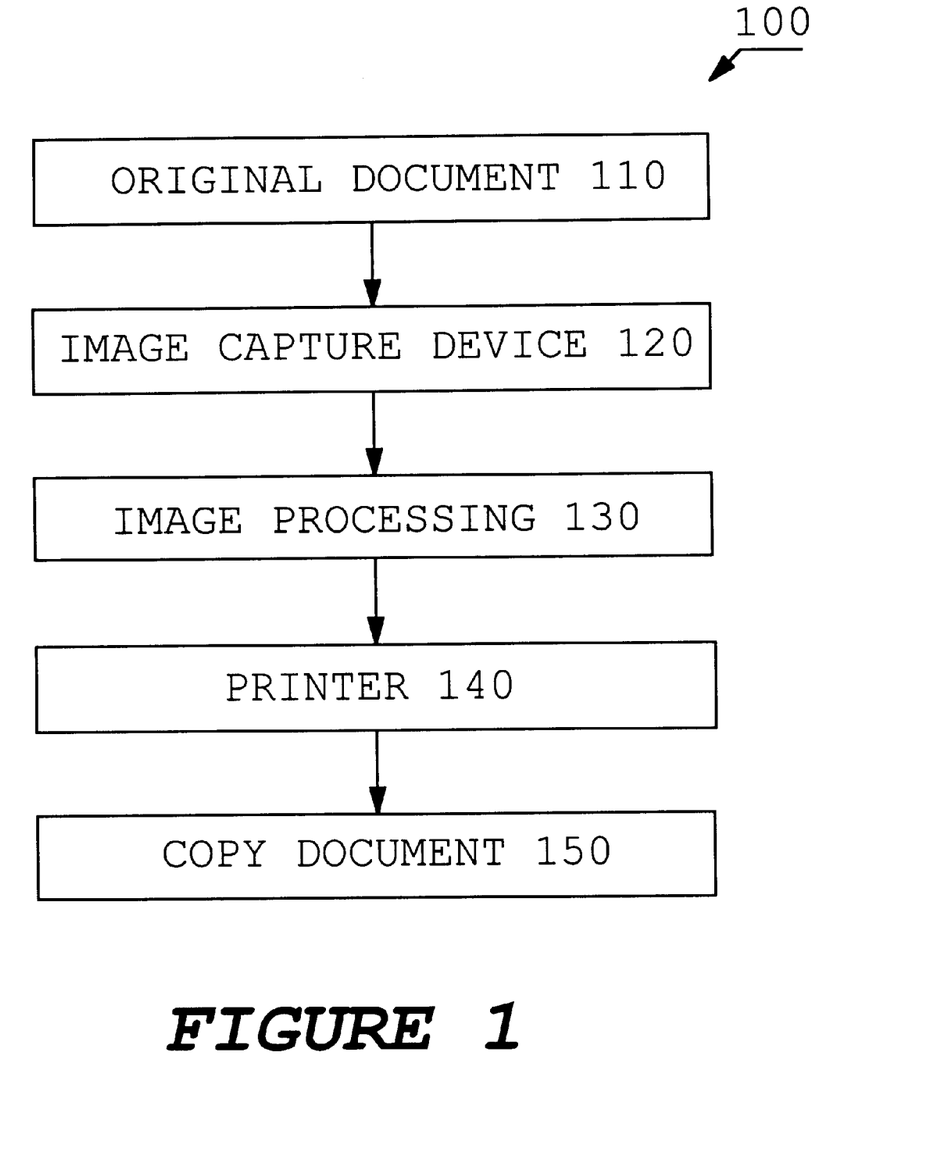
FIG. 1 is a diagram illustrating a color copying system suitable for use with a counterfeiting detection and deterrence scheme according to the present invention.

FIG. 1 is a diagram illustrating a color copying system 100 suitable for use with a counterfeiting detection and deterrence scheme according to the present invention. Image capture device 120 captures an image of original document 110. Image processor 130 processes the image captured by image capture device 120 so that printer 140, can produce copy document 150. As will be explained below in greater detail, image processor 130 has the ability to detect a characteristic seal within the captured image of original document 110. An example of such a seal is the treasury seal which appears on, currency of the United States of America and has a characteristic color, size, density and radial density profile. In the event that a seal is detected that has the characteristic color, size, density and radial density profile of a secure document, image processor 130 will deny or degrade printing of copy document 150 by printer 140. For example, to degrade printing, image processor 130 may change the characteristic color so that a different color is printed by printer 140 when producing copy document 150. The changed characteristic color will thus identify a copy as being counterfeit.

A banknote is an example of a secure document suitable for protection using a seal having a characteristic color, size and radial density profile. Other examples of suitable documents that may be targets of counterfeiters include: identification cards, bonds, or stock certificates. However, by marking any document with a suitable seal, the scheme can be used as a "do not copy" signal to degrade or deny copying of any other document.

Image capture device 120, image processor 130 and printer 140 may be separate components as shown in FIG. 1. Image capture device 120 can be a scanner or digital camera, but may also include a device that graphically generates the "captured" image. Image processor 130 can be a dedicated or general purpose computer, and the image processing function can be accomplished by software (for example as a printer driver), by hardware or by firmware. Printer 140 can function by any of a variety of known printing processes using mechanisms such as toner or ink. Alternately, one or more of these components can be combined, for example, as an integral color copier that scans, processes and then prints. Note also that it is possible for the image processing function 130 to be distributed throughout the system. Thus, a portion, or even all, of the image processing function 130 could be accomplished by the image capture device 120 or by the printer 140.

Image processing function 130 permits devices to detect secure documents in order to deter counterfeiting of the secure documents. A difficulty posed by prior detection methods is that detection often requires considerable computational effort by the device. For example, it is feasible to deter counterfeiting of US currency by degrading or denying copying upon detecting the image of the President's face. In practice however, this is impractical because it would involve carefully examining every document, and would considerably slow the time to process a page. Under such a scheme, in order to deter the tiny minority of documents that are possibly counterfeit, one must impose a throughput burden on the vast majority that are legitimate.

One can enable an efficient counterfeit deterrence by the use of an hierarchic detection scheme, in which the majority of documents are classified as free of suspicion using a simple characteristic color detection algorithm that imposes a negligible computational burden. The remainder of documents, which are labeled as suspicious, receive analysis by a block-based morphologic detection algorithm and then possibly other additional detection algorithms. If the suspicious document is identified as being a secure document, this will lead to printing with selectively deteriorated service or complete denial of service.

In the case of counterfeiting a US banknote, a counterfeiter will have to reproduce the following features (among others) with sufficient accuracy to pass a visible inspection:

Image of the President's face
Characteristic "banknote green" color
Fine detail of scrollwork
Round treasury seal on front of note.

A typical prior-art counterfeit detection mechanism will use a single level of testing to attempt to detect a counterfeit. In a typical conventional detection mechanism, service is denied once a feature that is present only on secure documents is detected. However, the computational effort involved in detecting a feature present only in secure documents can be very high. The allowable rate of false positives (cases where we falsely determine that a secure document feature is present) must also be very low. This is because denial of service is typically not tolerable when legitimate documents are printed. Thus, there are two preferred traits of a feature to be used in a detection mechanism:

Feature occurs only on secure documents.
Feature is easily detected.

It is extremely difficult to satisfy both constraints. For example, although an exact copy of the Andrew Jackson portrait on the US $20 bill is unlikely to appear on a legitimate document, the burden of determining that an image is sufficiently different from Jackson to permit copying can be extremely high.

Figure 2:
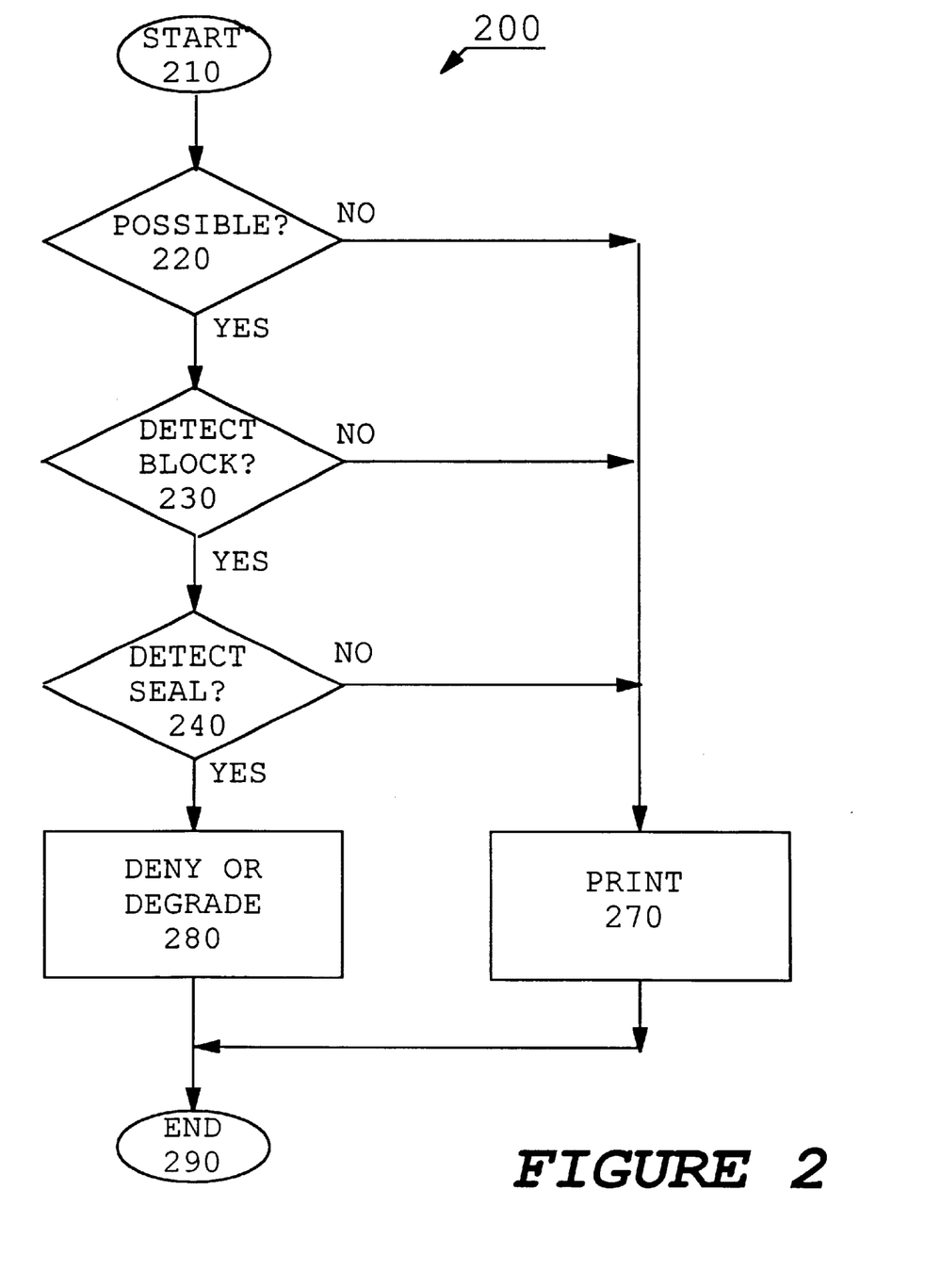
FIG. 2 is a diagram illustrating detection process flow according to an embodiment of the present invention.

FIG. 2 is a diagram illustrating multi-level detection process flow according to an embodiment of the present invention. The portion of image processing of interest begins at start bubble 210. At decision block 220, a test is made to determine whether or not counterfeiting of a color document is possible. For example, if it is known that the document being copied is to be printed as a black-and-white or grayscale copy, then it is not possible to generate a counterfeit copy of a color document. This is because the copy will not have color, so there would be no chance of confusing the non-colored copy with an original. Therefore, to save processing time in a case such as just described, there would be no need to perform additional detection. Note that test 220 is optional and could be eliminated, with the only substantial effect being that detection processing would occur in every case, with an attendant increase in processing delay.

FIG. 2 illustrates an hierarchic detection mechanism wherein initial detection of a suspicious event causes subsequent, (possibly more complex), detection mechanisms to be invoked. In this case, a first level detection mechanism 230 determines whether or not the document contains a block having a characteristic color. Only if the outcome of this test is positive (i.e., suspicious document detected) is the additional, detector 240 invoked to search for additional adjoining contiguous characteristic colored blocks that would form the seal (and possibly the presence of other secure features). An advantage of this hierarchic approach is that, because the first detection mechanism sends suspicious documents to a potentially more complex algorithm for further inspection, the first detection mechanism can have a higher false positive rate. If the first level detection correctly classifies the majority of legitimate documents as being "unsuspicious", it will have negligible impact on the majority of documents printed and will still allow a complex detection mechanism to be employed at the second level. Thus, two desirable traits of our first level detection scheme are:

- It has negligible impact on the throughput of the device (for example, the time taken to print a page should be impacted only very slightly)
- It correctly classifies the vast majority of legitimate documents as being "unsuspicious" while classifying almost all counterfeit documents as being suspicious.

The second (or higher) level detection mechanism 240 has the trait that it should distinguish accurately the legitimate from the counterfeit documents among all those passed to it as "suspicious." Because this second detector processes only a small portion of the pages printed when the printer is used for legitimate purposes, it can be allowed to have a greater impact on the time taken to process a page than the first level detection. Thus our second level detection scheme can even have far looser constraints than the detection mechanism used in a conventional system. The looser constraints make its design far easier than designing a single mechanism which must process every image as quickly as possible without error. However, the second stage need not be more complex than the first. For some circumstances and tests, it may be sufficient to confirm a suspicious document as a counterfeit attempt after detecting two (or more) different suspicious characteristics in two (or more) respective stages (e.g., one per stage). Thus, in the simplest case, the detection of a plurality of adjoining characteristic colored blocks, forming a group of blocks having the approximate size as a seal, would be adequate to confirm that an attempt is being made to copy a secure document.

If it is determined in decision block 240 that an attempt is being made to print a secure document, then printing is denied or degraded 280 before termination 290. Otherwise, after counterfeiting has been ruled out, the document is printed 270 before termination 290.

Note that after second level detection scheme 240 detects a seal, if even higher certainty is desired, one can continue testing the remainder of the page being copied using other known tests. Of course, alternatively, if additional tests are desired beyond second level detection scheme 240, one can restart at the beginning of the suspicious page, and retest the entire page at the higher level.

Also note that it is possible to begin degradation of image quality as soon as a document has been identified by first level detection 230 as being suspicious. Then if it is determined in decision block 240 that an attempt is being made to print a secure document, printing can be denied or further degraded 280 before termination 290. Otherwise, after counterfeiting has been ruled out, the document is printed 270 with slight (possibly unnoticeable) degradation before termination 290.

Figure 3:
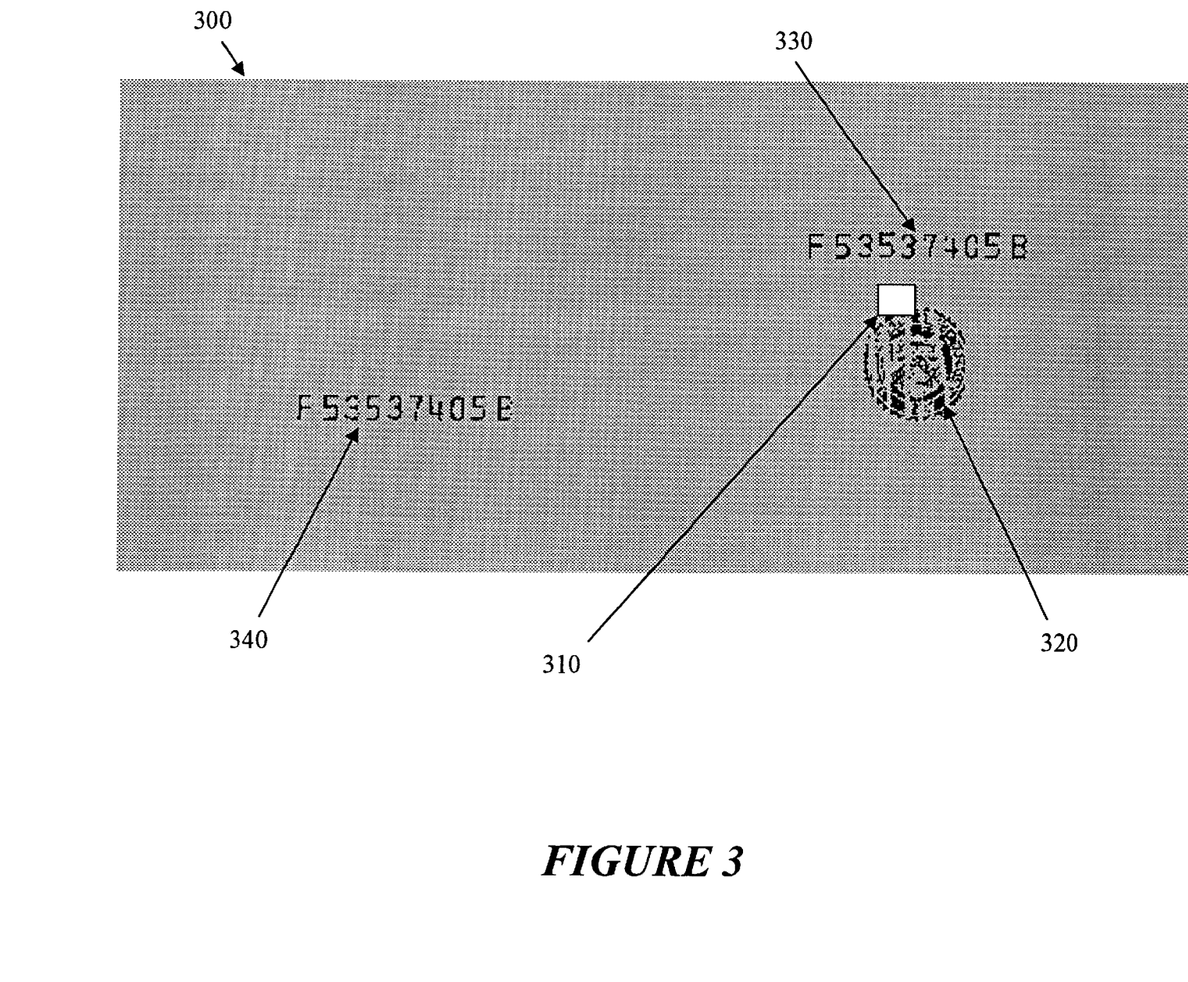
FIG. 3 is a diagram illustrating currency having a seal suitable for use with a counterfeiting detection and deterrence scheme according to the present invention.

FIG. 3 is a diagram illustrating currency having a seal suitable for use with a counterfeiting detection and deterrence scheme according to the present invention. To prevent counterfeiting of currencies on digital reproduction devices, such as scanners, printers, or copiers, an anti-counterfeiting scheme at the device driver must be able to recognize the currency at any location and orientation, and in any surrounding context. The recognition problem is very challenging, particularly because of the limited processing power at the device driver. Therefore, there is a great need for reliable, fast, and low-complexity currency detection approaches.

Block-based morphological detection set forth here is one such approach for the US currency. The approach detects a dollar bill by looking for the treasury seal in the front side of the bill. There are two basic motivations for such an idea. First, the treasury seal is printed with a very special green color that distinguishes it from most other parts of the bill. Second, the seal has an approximately round shape, which makes the detection rotationally invariant. The scheme uses block-based morphological dilation to group blocks containing the special green color. It requires very little computation and storage because of the use of iterative growing in a block-based fashion.

One can start to understand the scheme by examining the special green color. FIG. 3 shows its occurrence in the dollar bill 300. It is seen that in addition to the treasury seal 320, there are two other regions 330 and 340, corresponding to the bill's serial number, that are also printed with the same color. Except for these features, there are no other occurrences of this special green on the portrait side of the bill.

As will be described below in greater detail (in connection with FIG. 7), a color look-up table can be used to detect an occurrence of the characteristic color, for example during color space conversion. After a pixel of the characteristic color has been detected, one can quickly search for a block of pixels having additional pixels of the characteristic color. If part of a seal, then the block will have to have an appropriately high density of the characteristic color. Thus, if the small block has an insufficient number of characteristic colored pixels, then it cannot be part of the seal.

However, if the small block does have a sufficient number of characteristic colored pixels, then it may be part of the seal and the block-based morphological detection search should be conducted. Therefore, if one processes the input image in a block-based fashion, and uses a block size 310 of just under half the distance between the treasury seal region 320 and its closest characteristic colored neighbor, i.e., the serial number region 330 directly above it, one will be able to correctly isolate groups of blocks (suspicious regions) for further detection. The advantage of doing this is that the use of a big block size (about ⅛ inch) makes region computation very simple. The treasury seal is only as big as a few (about 5) blocks in each dimension. In this approach, suspicious neighboring blocks are grouped together using iterative morphological dilation operations, and the process stops once the number of blocks grouped becomes larger in any dimension than the target size for the treasury seal.

Figure 4:
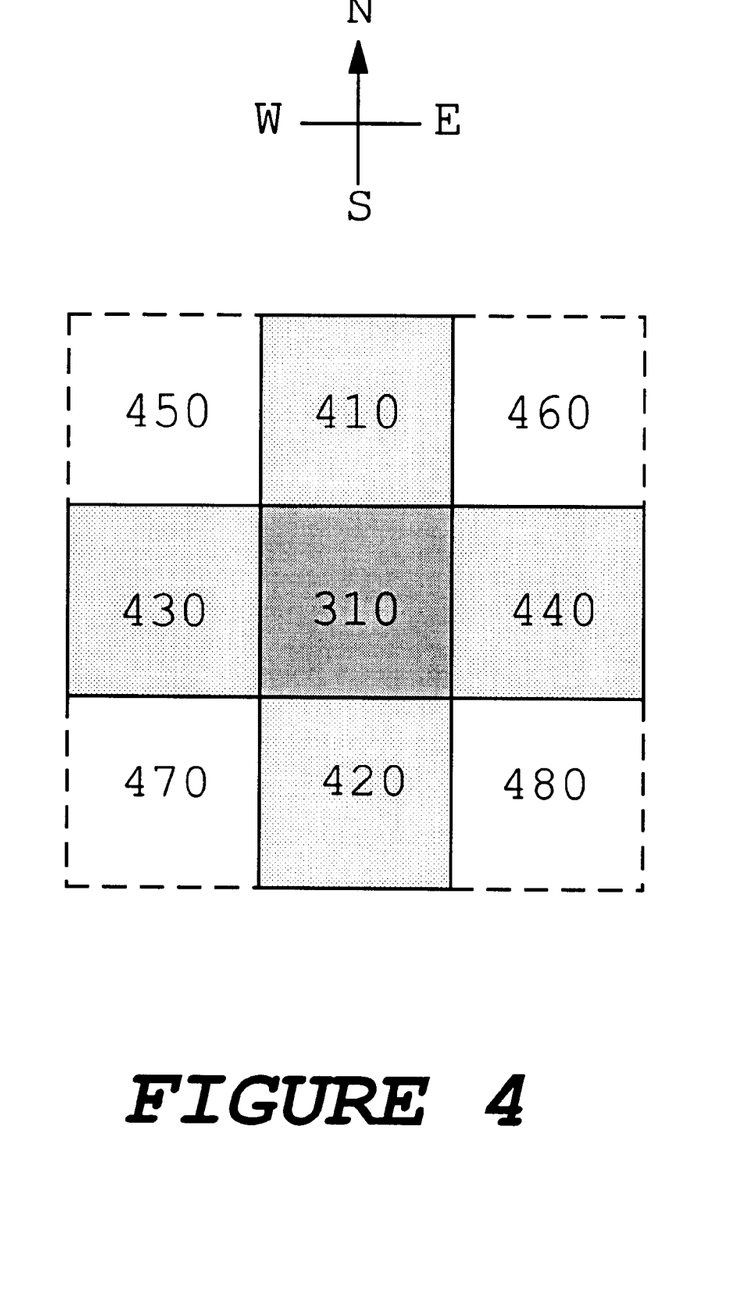
FIG. 4 is a diagram illustrating an initial step for block-based morphological search and detection according to an embodiment of the present invention.
Figure 5:
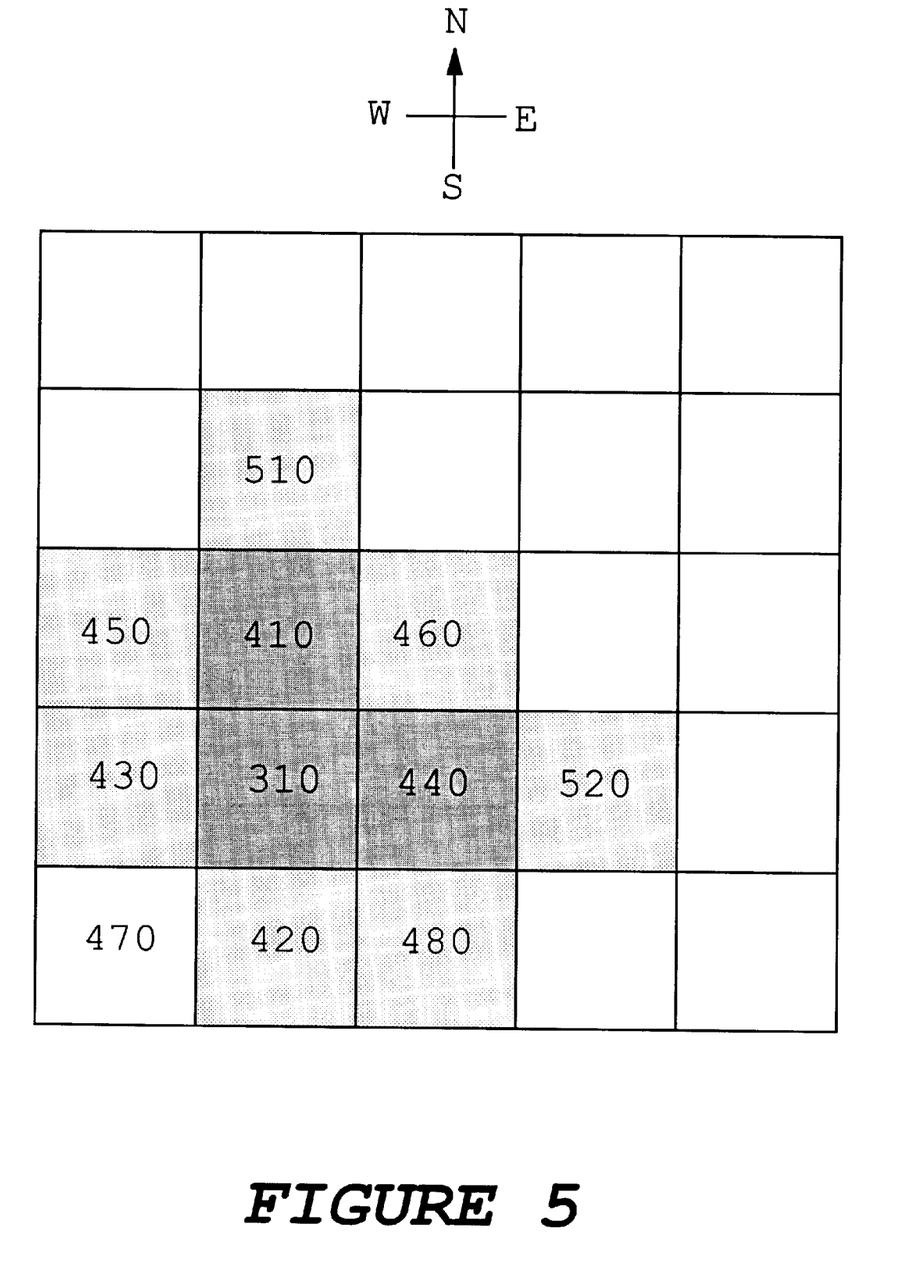
FIG. 5 is a diagram illustrating a subsequent step for block-based morphological search and detection according to an embodiment of the present invention.

FIGS. 4 and 5 together illustrate the dilation process. FIG. 4 is a diagram illustrating an initial step for block-based morphological search and detection according to an embodiment of the present invention. Starting from any single block (i.e., the initial region 310), one looks at the four blocks to its north (410), south (420), east (430), and west (440), to see if any of these contain a sufficient amount of the suspicious color. If so, our region is enlarged to include those blocks (the blocks to the north 410 and west 440 in this example). Note that alternative search patterns and block shapes can also be employed. For example, rather than beginning by searching only in the four cardinal point directions, one could include northeast (450), northwest (460), southeast (470) and southwest (480), and thereby search eight neighboring blocks. By the same token, one could use non-square blocks such as rectangles, hexagons, or octagons.

FIG. 5 is a diagram illustrating a subsequent step for block-based morphological search and detection according to an embodiment of the present invention. The new member blocks 410 and 440 are then used as the central block for the next iteration, and their neighboring blocks will again be examined. Note that previously examined blocks need not be re-examined. Thus, for block 410, only blocks 450, 460 and 510 need be examined because block 310 has previously been examined. Then, for block 440, only blocks 480 and 510 need be examined because blocks 310 and 460 will have already been examined. This process iterates until no new blocks are incorporated at a certain iteration, or until the region size exceeds the target.

Figure 6:
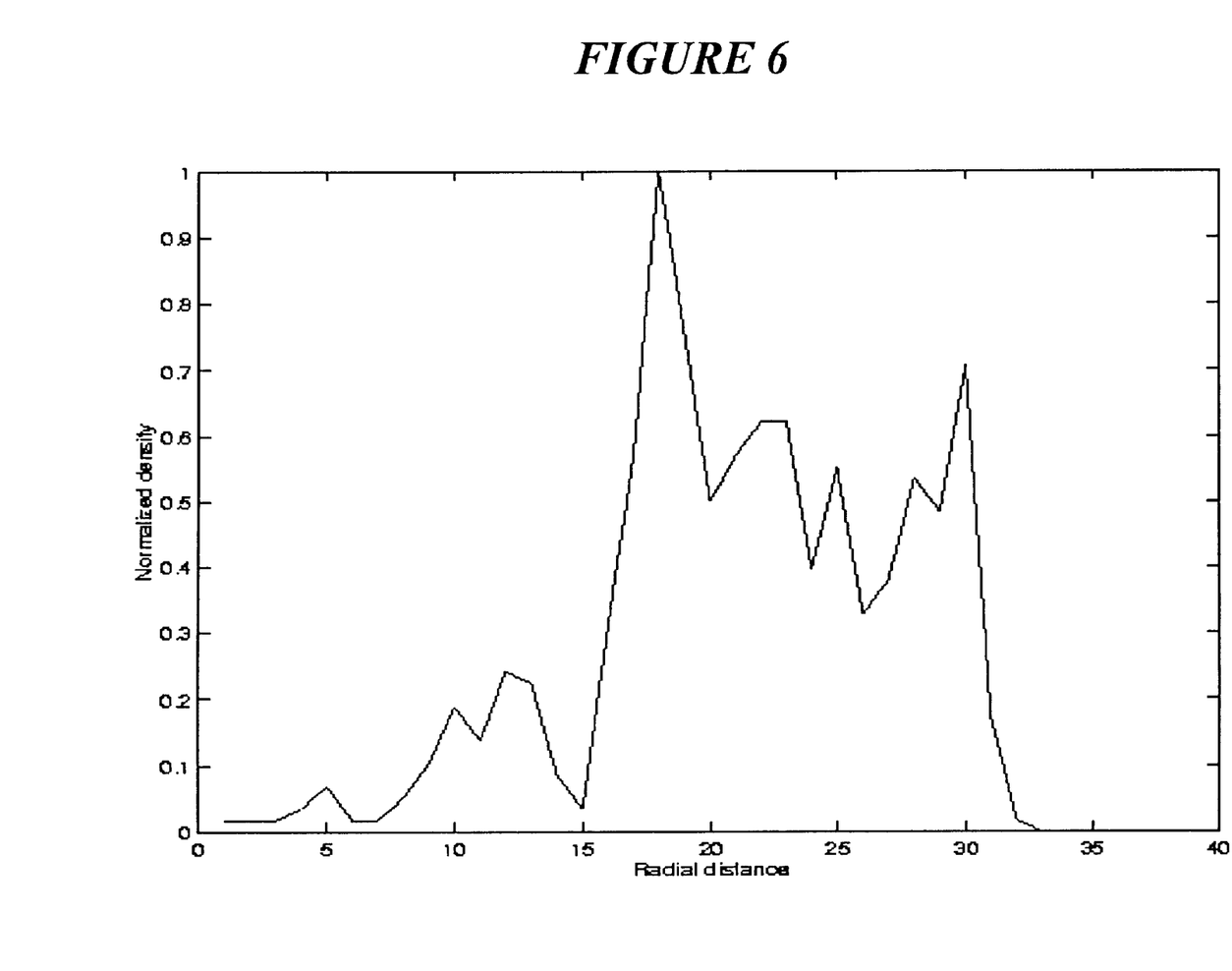
FIG. 6 is a diagram illustrating a characteristic color radial density profile according to an embodiment of the present invention.

After regions are found, one can then apply a series of tests on them, to further verify the suspicion. Typically, any region eliminated by a previous test will not be examined in later tests. For one embodiment, the tests are:

1. Size test: no matter at what orientation, the treasury seal has about the same fixed size in each dimension. If it is a seal, the suspicious region should satisfy this test.
2. Density test: the density of the suspicious color in the target region should agree with that in the treasury seal.
3. Radial density profile test: starting from the center of the region, at every radial distance, the density of the suspicious color in the concentric circular region should agree with that of the seal. FIG. 6 is a diagram illustrating a characteristic color radial density profile according to an embodiment of the present invention, i.e., that of the treasury seal. Note that the profile is rotationally symmetric.

The computational complexity of the detection scheme is clearly very small. The treasury seal detector has been implemented with a C program under HP Unix 10.20. It was then tested on various scanned dollar bills at different location, orientation, and embedment, and other images with the suspicious green color as well. There was never a false detection! Furthermore, the program always finished within 0.1 second, which was the smallest time interval that could be measured with the test equipment, and therefore probably exaggerates the amount of time necessary for execution.

The quickness and accuracy of the test is understandable from the algorithm. To make a false detection, one must have a region with the same color, size, round shape, density, and radial profile as the treasury seal, which is very unlikely. The program is fast because an entire dollar bill is only about 50×20 blocks, and the treasury seal is only 5×5 blocks. Therefore, the block-based region growing always terminates after a few iterations.

Computation of density and radial profile is straightforward once the regions are found. The program does not require extra storage, except for a binary block pattern (a 50×20 binary image for a single bill) for the color detection. The storage requirement to perform the initial characteristic color detection is also negligible. In addition, there are some other important advantages.

A first advantage is that the design requires no change to US currency and only small changes in other documents. In the case of other documents, except for adding a suitable seal, it does not affect the features and appearance of the original documents. Therefore, the social, economic, and psychological effects caused by the changes will likely be small. In fact, the seal could be marked and then detected in an alternative embodiment using a non-visible "color" (e.g., infrared or ultraviolet markings). However, the presence of a visible seal helps to add credibility to a document being examined by a recipient (such as when a merchant receives payment in the form of a check having a suitable seal).

Another advantage is that the design is universally applicable to any type of document which has a seal with an appropriate shape and color. Moreover, the large amount of design freedom under the size, color and density constraints can be used to make the seal best adapt to the host document (e.g., for aesthetic considerations).

Furthermore, the detection offers a successive range of tradeoff between computational complexity and detection accuracy, which can be fine-tuned to each particular type of application and documents. For example, for very important applications, one may want to be more cautious about avoiding false positive detections. Therefore, one would spend more computation time and only take a prevention action when a very high level of suspicion is reached. At the extreme case, one may even make a comparison on a pixel-by-pixel basis. For example, the morphologic search could be used to detect the locations of the seal and serial numbers. One could then use the centers of the seal and serial numbers to orient and compare the aligned version of the document. For less stringent applications, however, one may care less about detection accuracy and can tolerate a higher false positive (or false negative) detection rate. Therefore one can choose to save computation time by setting a lower detection threshold.

Figure 7:
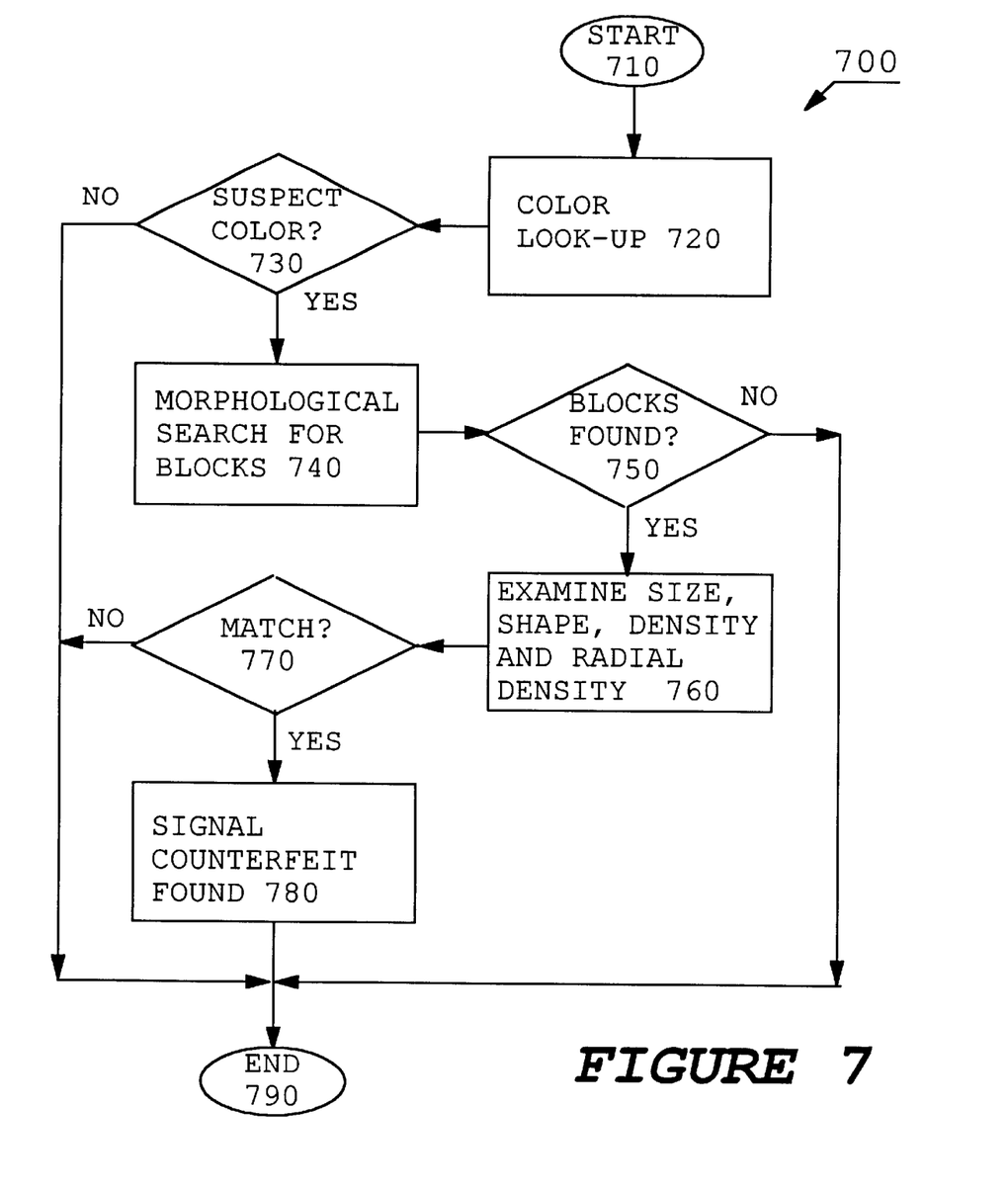
FIG. 7 is a diagram illustrating the detection process according to an embodiment of the present invention.

FIG. 7 is a diagram illustrating multi-level detection process flow according to a color look-up table embodiment 700 of the present invention. The portion of image processing of interest begins at start bubble 710.

In process block 720 a color look-up is performed for the pixel of interest. That is to say that a color mapping is performed from one color space to another using a color look-up table. For example, an input device may record a captured document using the RGB (red-green-blue) color space, but the printer may print documents using the CMYK (cyan-magenta-yellow-black) color space. If the pixel of interest has a color represented in the RGB color space, a color look-up table (LUT) can be used to find the corresponding CMYK value.

A test is then performed in decision block 730 to determine whether or not the pixel of interest has a suspect color, i.e., a color that is the same, or close to, the characteristic color of the seal. If the color look-up is for some color other than the characteristic color, then the pixel value for the printed image that has been obtained from the LUT is returned and this portion of processing for the pixel of interest ends 790.

If it is determined in decision block 730 that the color look-up was for a color that is the same, or close to, the characteristic color, then a block-based morphological search is conducted in process block 740 to attempt to find a group of adjoining characteristic colored blocks. Based on the search, a test is then performed in decision block 750 to determine whether or not a group of adjoining characteristic colored blocks has been identified. If such a group of blocks has not been found, then the pixel value for the printed image that has been obtained from the LUT is returned and this portion of processing for the pixel of interest ends 790.

If it is determined in decision block 750 that a proper sized group of adjoining characteristic colored blocks has been found, then a suspicious document has been identified and it is possible to proceed directly from decision block 750 to block 780 and signal that a counterfeit was found. As mentioned previously, the signal can include degradation or denial of printing of the copy.

Alternatively, the group of adjoining characteristic colored blocks can be further examined. For example, as shown in FIG. 7, the group of adjoining characteristic colored blocks can be further examined 760 to see if they match the size, shape, density and radial density profile of the seal. The process block 780 signal that a counterfeit had been found would only be made if decision block 770 confirms that the comparison matched.

For yet another alternative embodiment, after a match to the seal is found, any of the counterfeit detection tests known in the art can be performed on the suspicious document to further verify the results.

Returning to the initial block detection mechanism, this test can be performed using either a look-up table (LUT) especially designed for the purpose, or using one already in use in the printer, scanner or software pipeline.

Many devices use a LUT to convert between color spaces such as RGB and CMYK. In this case one can identify that region of the LUT input space to which suspicious pixels belong. Then, along with the output of the LUT, one can pass an extra parameter indicating whether the accessed color was in the suspicious region or not. If there is no LUT in use in the device pipeline, the specially designed LUT can have as output only the parameter indicating whether the input belongs to the suspicious region of the LUT or not.

In cases where the Treasury seal is not used, considerable freedom is available in choosing the colors of seals to be used in determining suspicion. Colors that commonly appear in large amounts on legitimate documents (e.g. skin tones, sky blue, grass, and black) typically make poor choices, while colors that are less common typically are good candidates. For some documents, detection of several different colors is better than reliance on detection of one color. For example, if each of seven different colors appears in legitimate documents with probability 0.1 (i.e., each color appears on about 10% of documents), appearance of individual blocks, or groups of blocks, of all seven colors would occur in only one legitimate document in ten million (assuming independence).

Detecting the suspicious colors can be performed using in a look-up table (LUT), either specially designed for the purpose, or already in use in the printer, scanner or software pipeline. If the LUT is already part of the pipeline, a parameter can be added to the output of the LUT to indicate when a suspicious region of the LUT input space has been accessed. If more than one color is being detected, one or more parameters can be returned by the LUT to indicate which color was detected. Note that if the LUT is designed only for this detection purpose, these parameters may be the only output of the LUT.

Implementation details of the characteristic color detection mechanism will vary depending on the constraints of the device on which it is to be implemented. Color conversion LUTs are commonly smaller than the input space of the image. That is, the LUTs do not contain an entry for every possible input, but have entries for some portion of the possible inputs, and have an interpolation algorithm to expand them. For example although the LUT for a 24-bit RGB image ideally ought to be 256*256*256, a far smaller table, say 30*30*30, will often suffice.

Even so, if memory size is critical, the LUT can consume considerable space. This factor is especially important when designing an ASIC. In such a case, the extra bit (or bits) per entry needed to detect the seal, might have a non-negligible cost impact on the detector. Because the bits added to the LUT in the first-level detection are not required to reproduce accurate colors, and are used merely to characterize regions of the LUT as being suspicious, it is possible to employ yet a smaller LUT, of size, say 6*6*6, that will be used exclusively for the detection of suspicious regions of color. This additional LUT will take far less memory space than would be needed to combine the color conversion and suspicious color detection functions into one LUT. Accesses to this table could be used before or after the accesses to the main color conversion LUT, or could be accessed in parallel, if the hardware or software architecture permits parallel computation.

Note also that detection of the seal need not be performed during color look-up, but could be performed at any suitable point in the image pipeline, perhaps even as a preprocessing or postprocessing operation.

Returning to the additional higher level tests, an example of a method suitable for augmenting the second level detection is one that detects some visible mark or geometric feature. As pointed out earlier, efficiency of the higher level detection mechanism is no longer as critical, because very few pages will ever be examined by this detector. Any scheme that detects any characteristic feature or series of features on the note will serve. A preferred characteristic of the higher level detection mechanism is that, once the lower-level detection has characterized the page as suspicious, there should still be a sufficient amount of the note remaining to be printed to permit the higher level detection to make an unambiguous decision. However, alternatively, the higher level detection could reprocess an entire document after it had been identified as suspicious.

It should be clear that one could use various different actions when a suspicious event is found. One could refuse all further function by stopping the rendering process. In certain cases it may be desirable to deteriorate selectively the rendering, once the first level detection has classified a document as suspicious. This could occur in addition to, or instead of, the higher level detection mechanism. Preferably, deterioration should affect aspects of the printer's capability that matter more for counterfeit copies than for legitimate documents. These include individual or combinations of the following:

Deliberate mis-rendering of color. Once a threshold amount of a suspicious color is detected, this color can be mis-rendered by modulating the color with a function of the amount used.

Deliberate mis-registration. Addition of a small, unpredictable jitter to the coordinates on the physical page from which rendering begins will make accurate registration between sides of the page extremely difficult.

Deliberate deterioration of halftoning. Substitution of a poorer quality dither matrix, or substitution of non-optimized weight for error diffusion will make reproduction of accurate detail more difficult.

To summarize, the present invention has the following advantages:

It causes negligible impact on time to render a page.

It has negligible effect on general images and documents, while generating visible artifacts on banknote images or denying their printing.

It can be deployed in the driver with no hardware changes.

The detection function can be changed or fine-tuned to trade-off between speed and accuracy.

The area of the LUT that is classified as suspicious can be adjusted to arrive at a compromise that allows reasonable detection, while giving minimal effect on legitimate users.

No redesign of currency is required and, at most, only minimal redesign of other secured documents is required.

Furthermore, so long as the characteristic color or other aspects of the seal does not change, no alteration is required for a new series of notes.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of determining whether a document is identified by a seal, the seal having a characteristic color, the method comprising:

a) generating an image of the document;

b) searching the image for a suspicious block having at least one pixel of the characteristic color; and c) identifying each block contiguous to any suspicious block as suspicious, if the contiguous block also has at least one pixel of the characteristic color, wherein the contiguous suspicious blocks collectively form a suspicious region.

2. The method of claim 1 further comprising d) classifying the document as non-suspicious if a size of the suspicious region does not substantially match a size of the seal.

3. The method of claim 1 further comprising d) classifying the document as non-suspicious if a shape of the suspicious region does not substantially match a shape of the seal.

4. The method of claim 1 further comprising d) classifying the document as non-suspicious if a density of pixels having the characteristic color does not substantially match a corresponding pixel density of the seal.

5. The method of claim 1 further comprising d) classifying the document as non-suspicious if a radial density of pixels having the characteristic color does not substantially match a radial density profile of the seal.

6. The method of claim 1 further comprising d) classifying the document as suspicious if the suspicious region has substantially a same size, shape, density of pixels having the characteristic color, and radial density of pixels having the characteristic color.

7. The method of claim 6 further comprising d) degrading the image before reproduction, if the document has been classified as suspicious.

8. The method of claim 7 wherein degrading the image includes substituting another color for any pixels having the characteristic color within the suspicious region.

9. A method of deterring counterfeit reproductions of secure documents having a seal of a pre-determined color, comprising the steps of:

a) partitioning an image of a document into a plurality of contiguous blocks;

b) classifying any block having at least one pixel of the pre-determined color as a suspicious block; and c) classifying the document as non-suspicious, if no suspicious block exists.

10. The method of claim 9 further comprising the step of:

d) identifying a group of contiguous blocks with the suspicious block as a suspicious region, if each block in the group has at least one pixel of the pre-determined color associated with the seal.

11. The method of claim 10 further comprising the step of:

e) classifying the document as non-suspicious, if no suspicious region exists.

12. The method of claim 10 wherein step d) further comprises the step of performing a block based morphologic dilation of any suspicious block to identify the suspicious region of contiguous blocks.

13. The method of claim 10 further comprising the step of:

e) classifying the document as non-suspicious if a size of the suspicious region does not substantially match a size of the seal.

14. The method of claim 10 further comprising the step of:

e) classifying the document as non-suspicious if a shape of the suspicious region does not substantially match a shape of the seal.

15. The method of claim 10 further comprising the step of:

e) classifying the document as non-suspicious if a density of pixels having the pre-determined color does not substantially match a corresponding pixel density of the seal.

16. The method of claim 10 further comprising the step of:

e) classifying the document as non-suspicious if a radial density of pixels having the pre-determined color does not substantially match a radial density profile of the seal.

17. The method of claim 10 further comprising the step of:

e) classifying the document as suspicious if the suspicious region has substantially a same size, shape, density of pixels having the pre-determined color, and radial density of pixels having the pre-determined color as the seal.

18. The method of claim 17 further comprising the step of:

f) degrading the image before reproduction, if the document is suspicious.

19. The method of claim 18 wherein step f) further comprises the step of substituting another color for any pixels having the pre-determined color within the suspicious region.

20. The method of claim 10 further comprising the step of:

e) performing the reproduction only if the document is classified as non-suspicious.

* * * * *